United States Patent
Clouet (10) Patent No.: US 6,481,481 B2
(45) Date of Patent: Nov. 19, 2002

(54) TREAD SUPPORTING MEMBRANE

(75) Inventor: Alain Clouet, Saint-Maurice (FR)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 09/861,358

(22) Filed: May 18, 2001

(65) Prior Publication Data

US 2001/0035247 A1 Nov. 1, 2001

Related U.S. Application Data

(63) Continuation of application No. PCT/EP99/08792, filed on Nov. 16, 1999.

(30) Foreign Application Priority Data

Nov. 20, 1998 (FR) .............................................. 98 14695

(51) Int. Cl.$^7$ ......................... B60C 17/00; B60C 17/01; B60C 17/02; B60C 5/22
(52) U.S. Cl. ................................... 152/340.1; 152/339.1
(58) Field of Search ........................... 152/340.1, 339.1

(56) References Cited

U.S. PATENT DOCUMENTS 4,164,250 A 8/1979 Shichman 6,283,185 B1 9/2001 Rivaton

FOREIGN PATENT DOCUMENTS

| AU | 9853204 | 6/1998 |
|----|---------|--------|
| DE | 2520321 | 11/1976 |
| FR | 2370599 | 6/1978 |
| FR | 2756221 | 5/1998 |
| FR | 2772666 | 6/1999 |
| WO | 9823457 | 6/1998 |
| WO | 9932308 | 7/1999 |

OTHER PUBLICATIONS

U.S. patent application 09/595,179, Jun. 16, 2000, to Clouet Et Al.

Primary Examiner—Adrienne C. Johnstone
(74) Attorney, Agent, or Firm—Baker Botts L.L.P.

(57) ABSTRACT

A reinforced rubber toric membrane, inflated to a pressure $p_0$ greater than the pressure $p_1$ of the cavity of the tire in which it is used, has a hooping ply of cords or cables, oriented circumferentially, and is reinforced in each of its sidewalls by at least one ply of reinforcement elements, each being composed of a core having a breaking load which is firstly greater than the tension, per element of ply, due to the pressure differential $p_0 - p_1$ and to the maximum centrifugal force to which said element is subjected, and secondly such that it permits the breaking of said reinforcement elements for a pressure differential $p_0 - p'_1$ greater than $p_0 - p_1$ and after the breaking of the elements of the hooping ply, around which core is wound at least one cord or cable.

10 Claims, 4 Drawing Sheets

TREAD SUPPORTING MEMBRANE

This is a continuation of pending PCT/EP99/08792, filed Nov. 16, 1999.

BACKGROUND OF THE INVENTION

The invention relates to a support means for the tread of a tire. Said support means constitutes with said tire and its mounting rim a travelling assembly for a vehicle, intended to be able to travel after a consequent and unexpected loss of pressure of the tire, said tire being more particularly a tubeless tire of the heavy-vehicle or civil-engineering type.

French Application FR 2 756 221 describes and claims as support means for a tread a toric membrane of reinforced rubber, inflated to a pressure $p_0$ greater than the pressure $p_1$ of the cavity of the tire, and having, in the inflated state, a crown radius $R_M$ less than the loaded radius $R_E$ of the tire used at its recommended pressure, said membrane, at least in its crown, being reinforced by at least one ply of cords or cables, said crown of said membrane furthermore comprising at least one hooping reinforcement of circumferentially oriented cords or cables having a breaking load per cm of ply at least equal to the product of the crown radius $R_M$ and the pressure, per cm$^2$ of surface of said ply, resulting in a tension per cm of ply equivalent to the tension due to the maximum centrifugal force to which the tire can be subjected and permitting the breaking of the hooping cords or cables for a pressure differential $p_0-p'_1$, existing in the event of a loss of pressure experienced by the tire, greater than the initial pressure differential $p_0-p_1$, that is to say, during normal travel. Said hooping reinforcement may be composed of at least one ply, generally located among the crown reinforcement plies, or of several bands located in the recesses formed on the protective layer or support band radially covering the subjacent plies.

The internal pressure $p_0$ of said membrane, measured in the cold state, that is to say at 20° C., is greater than the pressure $p_1$ of the inner cavity of the tire by an amount between $0.5 \times 10^5$ Pa and $5.0 \times 10^5$ Pa, depending on the tire dimensions concerned. Given that the crown radius $R_M$ of the toric membrane is preferably between 0.80 and 0.97 times the loaded radius $R_E$ of the tire, mainly for reasons of heating of said tire, too high a pressure difference risks adversely affecting a certain number of properties of the tire itself, for example the life of the carcass reinforcement of said tire, while requiring an excessively large hooping reinforcement.

The crown of said membrane is preferably reinforced by two plies of cords or cables which are parallel to each other in each ply and crossed from one ply to the next, forming an angle of between 50° and 85° with the circumferential direction. The cables or cords are advantageously textile ones for reasons of lightness, flexibility and good corrosion resistance, and preferably are made of aromatic polyamide. The axial ends of the two plies are preferably located on the sidewalls of the membrane, such that, if S is the maximum axial width of the carcass reinforcement of the tire, the width of the plies is preferably between S and 1.30 S.

The pressure difference $p_0-p_1$ increases in the event of the tire puncturing and the cables of the hooping ply or plies breaking, and the toric supporting membrane expands into the cavity of the tire and enables the whole to continue travelling despite the drop in pressure in the cavity of the tire.

The toric membrane according to the invention described in, the above French application may possibly comprise sidewalls each reinforced by at least one ply of radial cords or cables, said sidewalls possibly being provided advantageously with radial grooves opening on to the metal mounting rim of the tire.

Under normal conditions of travel of the assembly formed by the tire, its mounting rim and the membrane, loading conditions, pressure conditions and speed conditions recommended for the tire in question, the membrane retains an equatorial radius which is practically constant and less than the loaded radius of the tire, and the outer walls of its sidewalls are for a very major part in-permanent contact with the inner walls of the tire. The friction existing between said walls results in premature degradation and wear of the impermeable layer of rubber which covers the inner wall of the tire.

French Application 97/16450, in order to overcome the disadvantages referred to above, proposes imparting to the membrane a particular sidewall architecture in that the sidewall reinforcement ply is wound on either side around an annular reinforcement element, the makeup of which permits breaking after the breaking of the hooping plies, said sidewall reinforcement ply having a meridian profile in the inflated state which is adapted such that there is no contact between the membrane and the inner wall of the closest sidewall from a certain height onwards. In other words, the presence of an annular reinforcement element makes it possible, in the inflated state and during normal travel, to maintain the desired meridian profile of the sidewall reinforcement ply or plies, while not preventing normal, complete expansion of the supporting membrane upon loss of pressure in the tire cavity.

The presence of an annular element or winding bead wire of the sidewall reinforcement plies of the membrane results in two major disadvantages:
- it is difficult, not to say impossible, to control the position of the pieces of bead wire after breaking: in particular, accentuated asymmetry, relative to the equatorial plane, of the positioning of the crown of the membrane after expansion, has thus been very frequently observed, which causes certain driving problems for the vehicle thus equipped;
- the breaking of the winding bead wires, in the case of a so-called closed supporting membrane (the cross-section through said membrane has a continuous contour), causes great extension of the membrane portions located radially beneath said bead wires, which results in breaking of said portions and escape of inflation gas from said membrane.

SUMMARY OF THE INVENTION

In order to overcome the disadvantages referred to above, while retaining, firstly, the principle of an expandable toric supporting membrane capable of filling the cavity of the tire when the inflation pressure of said cavity decreases and/or is cancelled out, and secondly the principle of the lowest possible length of contact between the membrane and the inner wall of the tire in the case of normal travel, the reinforced rubber membrane according to the invention
- used as a tread support means for a tire P, and forming with said fire P and its mounting rim J, the nominal diameter of which is $D_S$ and the flange of which has an external diameter $D_R$, a travelling assembly which is capable of travel when the tire is subject to a loss of pressure,
- inflated to a pressure $p_0$ greater than the pressure $p_1$ of the cavity of the tire, and having, in the inflated state, a crown radius $R_M$ less than the loaded radius $R_E$ of the tire used at its recommended pressure, said membrane being in its crown, reinforced by at least two plies of cords or cables parallel to each other in each ply and crossed from one ply to the next, at least one of said plies being a so-called hooping ply composed of at least one layer of cords or cables, oriented circumferentially and having a breaking load per cm of ply making it possible firstly to resist the tension due to the maximum centrifugal force to which the tire is subjected, increased by the tension due to the pressure differential $p_0-p_1$ existing during normal travel, and secondly the breaking of the cords or cables for a pressure differential $p_0-p'_1$ greater than $p_0-p_1$, and reinforced in each of its sidewalls by at least one ply, is characterized in that, viewed in meridian section, the sidewall reinforcement ply is anchored in each lower part of the sidewall by winding around an inextensible annular reinforcement element, which does not break under the action of the tension induced by the action of the sidewall ply and the internal diameter D of which is between the value $D_R$ and a value equal to $D_S$ minus the product of the width $L_S$ of the rim seat and the tangent of the angle of inclination of said seat, said sidewall reinforcement ply being formed of reinforcement elements, each element comprising a core surrounded by a helically wound cord or cable, the said core having a breaking load which is firstly greater than the tension, per element of ply, due to the pressure differential $p_0-P_1$ and to the maximum centrifugal force to which said element is subjected, and secondly such that it permits the breaking of said elements of the sidewall ply for a pressure differential $p_0-p'_1$, greater than $p_0-P_1$ and after the breaking of the elements of the hooping ply, and said reinforcement element of the sidewall ply having a curve, representing the tension as a function of the relative elongation $\epsilon$, having, for an elongation greater than the elongation at break $\epsilon_A$ of the core, a segment in which the variation in the tractive force as a function of the elongation is substantially zero, the elongation at break $\epsilon_R$ of the reinforcement element being at least equal to the ratio of the difference between the internal meridian length of the tire and the external meridian length of the membrane to the external meridian length of the membrane.

Preferably, the internal diameter D of the inextensible annular reinforcement element lies between the value $D_S$ and the value equal to $D_S$ minus the product of the width $L_S$ of the rim seat and the tangent of the angle of inclination of said seat.

The membrane crown is said to be reinforced by a ply when the presence of said-ply at the crown is effective, whatever the real width of the ply. A membrane sidewall is said to be reinforced by a ply if there is actually a ply in the sidewall; thus a ply anchored to the two membrane bead wires is a sidewall reinforcement ply but also a crown reinforcement ply.

DESCRIPTION OF THE DRAWINGS

The characteristics and advantages of the invention will be better understood with reference to the following description, which refers to the drawings illustrating an example of embodiment in non-limitative manner, in which drawings.

DESCRIPTION OF PREFERRED EMBODIMENTS

Figure 1:
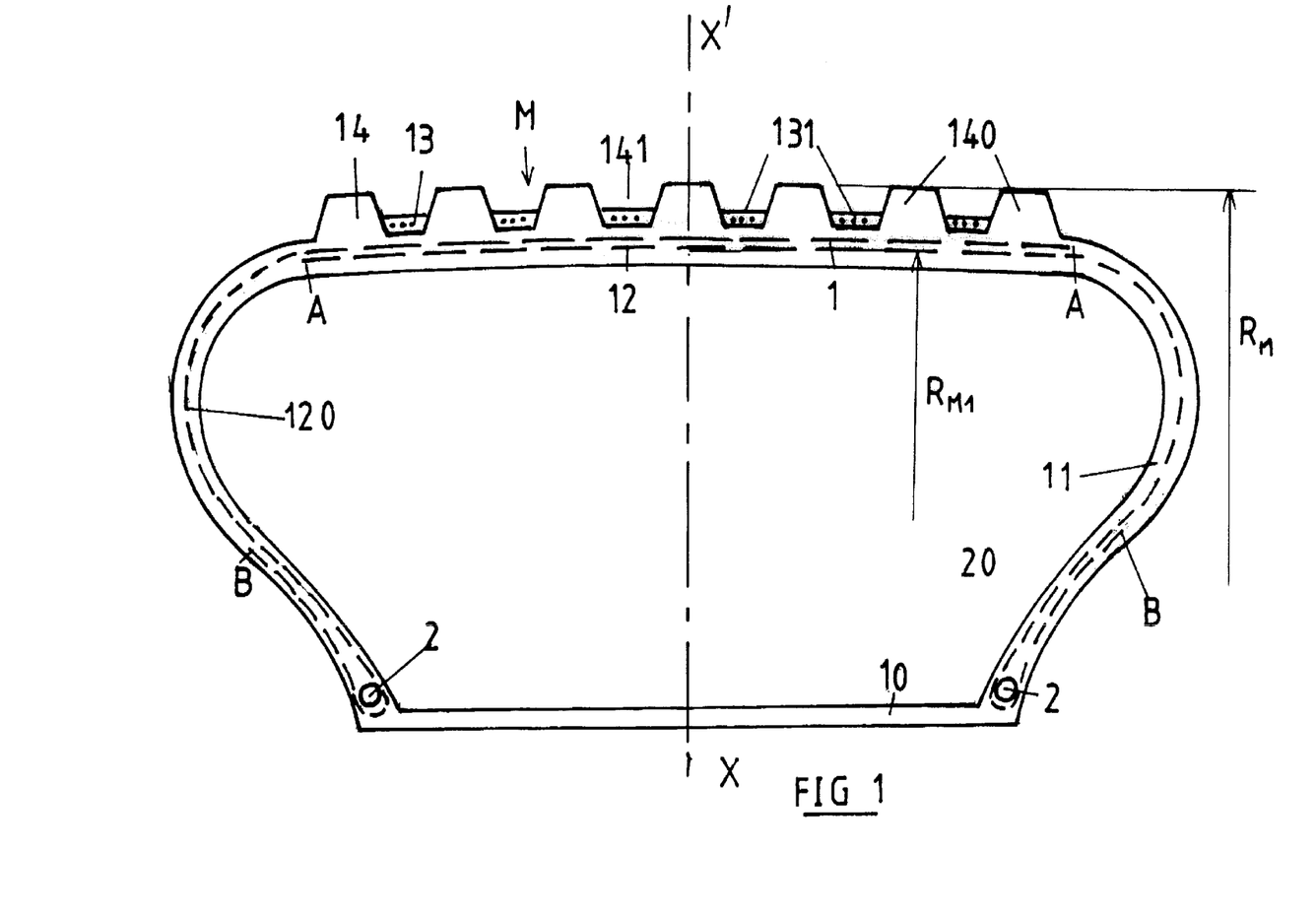
FIG. 1 is a diagram of a toric supporting membrane according to the invention.

The toric membrane M according to the invention, in the first example described (FIG. 1), is closed and reinforced at its crown 1. Of low thickness which is constant over its radially inner part 10, it is thicker on its sidewalls 11 and at its crown 1. It is reinforced overall by two plies 120, each ply being formed of reinforcement elements which are parallel to each other in the ply, and forming an angle of between 50° and 85°, more precisely equal to 60°, with the equatorial line XX' of the assembly, which angle will be of one direction for one of the plies and of the opposite direction for the other ply. The width of each of the two plies 120 is such that one of its ends A is located in the region of one of the shoulders of the membrane M, whereas the other end B of said ply 120 is the end of the upturn 20 which it forms after winding around an annular reinforcement element 2 in the lower part of the membrane sidewall located on the opposite side to said shoulder. The two plies 20, in the region AA of the crown of the membrane M, therefore perform the function of two crown reinforcement plies of elements which are parallel to each other in each portion of ply and crossed from one ply to the next, forming an angle of 60° with the equatorial direction, and in the region AB of the sidewalls perform the function of a sidewall reinforcement ply, each sidewall being reinforced by a ply of elements forming with the equatorial direction a variable angle of less than 90° and greater than the angle measured in the equatorial plane.

The assembly 12 of the two crown plies 120 thus formed, which is readily expandable, may be surmounted by a rubber support band 14 provided with frustoconical elements in relief 140 separated from each other by recesses 141. These frustoconical "blocks" form circumferential rows on the surface of the band 14, such that, between two axially adjacent rows of blocks 140, there is arranged a hooping strip 131 of circumferential cables, formed of three cords of aromatic polyamide. The assembly consisting of the strips 131 of 3 circumferential cables thus defined and forming the hooping assembly 13, their number being equal to the number of axial gaps between rows of blocks 140, performs the function of hooping the membrane M, firstly against the forces due to centrifugal force and secondly against the forces due to the pressure differential $p_0-p_1$, $p_0$ being the inflation pressure of the toric membrane M, which is equal to $10 \times 10^5$ Pa, and $p_1$ being the pressure of the tire P which is equal to $9.0 \times 10^5$ Pa. Said hooping function makes it possible for the membrane M and its crown plies, under normal travelling conditions of the assembly, that is to say, under the loading, pressure and speed conditions recommended for the tire in question, to retain respective radii $R_M$ and $R_{M1}$ which are practically constant (FIG. 2) and less than the loaded radius $R_E$ of the tire P under normal travelling conditions.

Each annular reinforcement element 2 is formed by winding 167×2 cables of aromatic polyamide. Such a composition imparts to said annular element virtually perfect extensibility and a tensile strength of at least 1.05 times the necessary strength induced by the tension exerted on the annular element of the reinforcement elements of the sidewall ply: thus the annular element 2, under the conditions mentioned, may be said to be inextensible and unbreakable. Said annular element is arranged radially as close as possible to the mounting rim of the tire and, in the case illustrated, its internal diameter is between the nominal diameter of the rim $D_S$ and the value $D_S$ minus the product $L_S$ x tan δ, $L_S$ being the axial width of the tire bead seat and tan δ the tangent of the angle of inclination of the seat of-the mounting rim.

Figure 3:
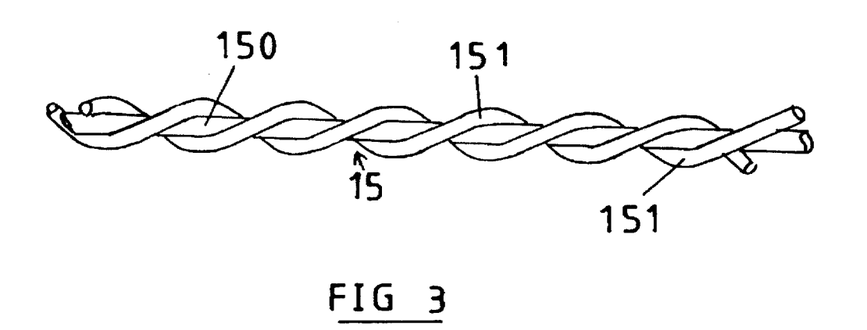
FIG. 3 is a diagram of a reinforcement element used for the sidewall reinforcement ply of the membrane.
Figure 4:
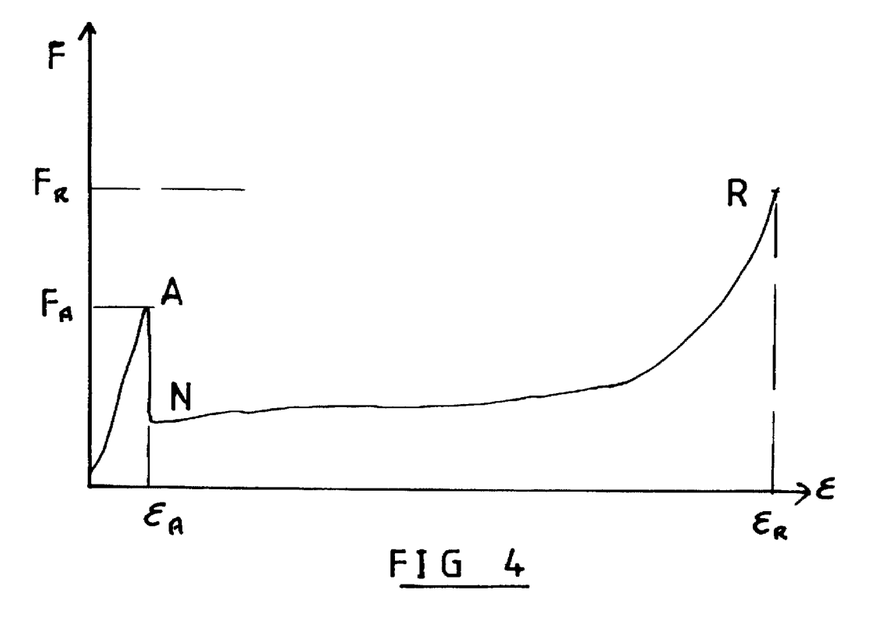
FIG. 4 is a curve showing the tensile force as a function of the relative elongation of a reinforcement element of a sidewall reinforcement ply.

Each reinforcement element 15 of the sidewall and crown reinforcement ply 120 (FIG. 3) is formed of a core 150, which in turn is formed of a 122×1 rayon reinforcement element. Said core has (FIG. 4) a breaking load $F_{RA}$ of 6.2 daN for a relative elongation $δ_A$ of 7.5% (point N of the curve representing the force as a function of the relative elongation). Around said core are wound cords 151 of 167 tex, each cord 151 being twisted on itself and the two cords 151 being twisted around the core 150. The reinforcement element 15 thus obtained, referred to as a breaking-core element, has a elongation at break $δ_R$ of 90% (point R on the curve), which is far greater than the elongation $δ_A$ at break of the core 150: after breaking of said core, the reinforcement element 15 therefore has a high potential of elongation before it itself breaks (portion NR of the curve), said potential being estimated at more than 80%. Said potential is very largely sufficient to permit complete expansion of the membrane until the tire cavity is filled, since the necessary, sufficient elongation is equal to the ratio of the difference between the internal meridian length of the tire and the external meridian length of the membrane to the external meridian length of the membrane, said lengths being measured from bead wire to bead wire.

In the case looked at previously, the circumferential reinforcement elements of the hooping bands 131 break at a certain pressure difference $p_0-p'_1$. It is obvious that using reinforcement elements having a structure similar to that of the elements 15 used for the plies 120 as reinforcement elements for the hooping bands does not involve departing from the scope of the invention. For example, each hooping element will be formed of a core of 110×1 aromatic polyamide, and, wound around said core, of two cables of 167×2 aromatic polyamide. The core of the hooping element then breaks at the supported tension which results from lowering the pressure $p_1$, whereas the overall element is not broken, although it has become very extensible. The solution makes it possible to avoid as far as possible the dispersion of the pieces of strip after the latter have broken, but at the expense of substantially higher material costs.

Figure 2:
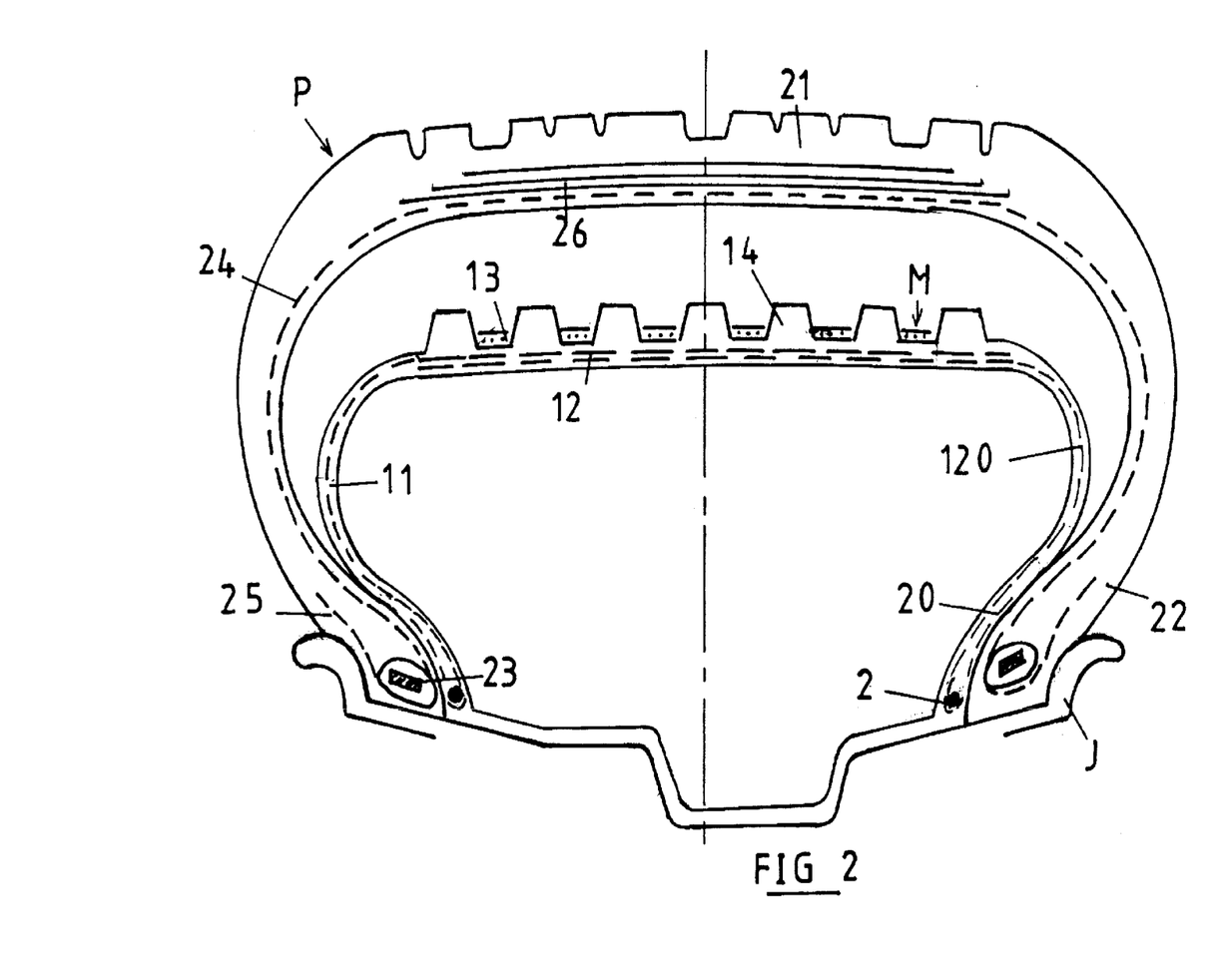
FIG. 2 is a diagram of the membrane of FIG. 1 in position in the tire mounted on its operating rim and inflated.

In FIG. 2, the assembly is composed of the tire P, of dimension 495/45-R-22.5 in the example described, the mounting rim J, and the toric membrane M according to the invention. The tire P is a universally known tire, with sidewalls joined radially on the outside to a tread 21 and extended radially on the inside to two beads 22, each bead 22 being reinforced by at least one bead wire 23 around which a radial carcass reinforcement 24 is anchored to form upturns 25. Said carcass reinforcement 24 is surmounted radially in the crown by a crown reinforcement 26, composed of at least two plies of metal cords or cables which are parallel to one another in each ply and crossed from one ply to the next, forming an angle which may be between 5° and 45° with the circumferential direction. The tire P is referred to as tubeless, and comprises on the inside a layer of rubber mix which is impermeable to the inflation gas.

Figure 5:
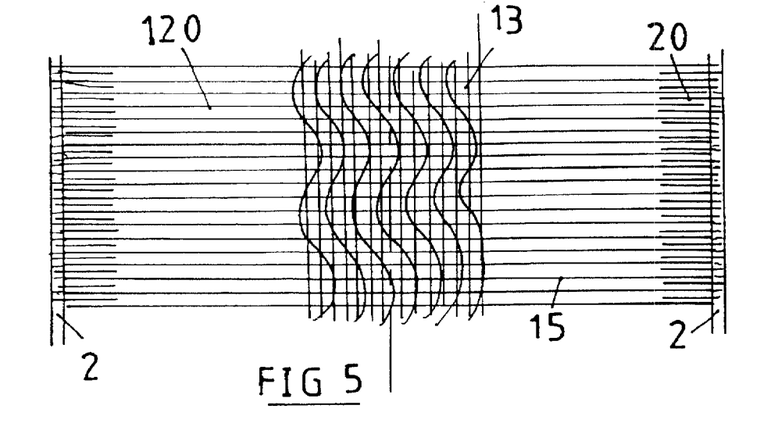
FIGS. 5 to 7 are diagrams of variants of the supporting membrane according to the invention.

FIG. 5 shows the simplest architecture of the supporting membrane, the crown and the sidewalls of said membrane being viewed in one plane. The sidewalls 11 are reinforced by a single radial ply 120 of breaking-core reinforcement elements 15 of the same composition as those described previously, but radial. Said radial ply is also the crown ply since it is axially continuous from bead wire 2 to bead wire 2 of the membrane M. The crown 1 of said membrane is complementarily reinforced by a hooping ply 13 arranged radially beneath the support band 14, said hooping ply being formed of reinforcement elements such that the breaking load per cm of ply is a linear function of the inflation pressure $p_1$ of the cavity of the tire, the angular coefficient of the representative straight line being equal to 0.05 and the ordinate at the origin of said straight line being equal to $0.3×10^5$ Pa, the tire in question being a "heavy-vehicle" tire. The crown will advantageously be completed, radially to the outside of the hooping ply, by at least one ply of metallic reinforcement elements undulating in the plane of the ply, which are parallel to each other within the ply and oriented relative to the circumferential direction at an angle which may lie between 0° and 90°, the amplitude and the wavelength of the undulations obviously being selected so as not to hinder the radial expansion of the membrane.

Figure 6:
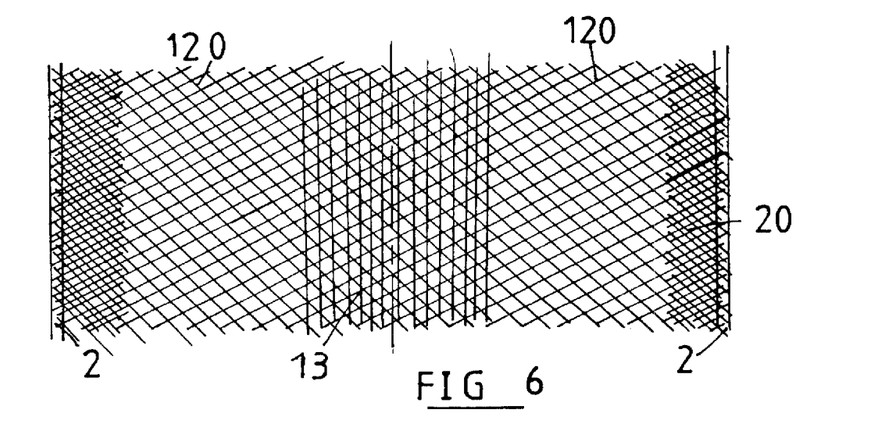

FIG. 6 shows a membrane architecture with two plies 120 which are continuous from bead wire 2 to bead wire 2, formed of breaking-core reinforcement elements 15 of the same composition as those described previously, but crossed from one ply to the next, forming with the circumferential direction an angle, measured in the equatorial plane of the membrane, of between 50° and 85°, and more precisely equal to 60°. The two plies 120 are sidewall reinforcement plies and crown reinforcement plies, the crown being complementarily reinforced by a hooping ply 13 as shown in FIG. 5 and described previously.

Figure 7:
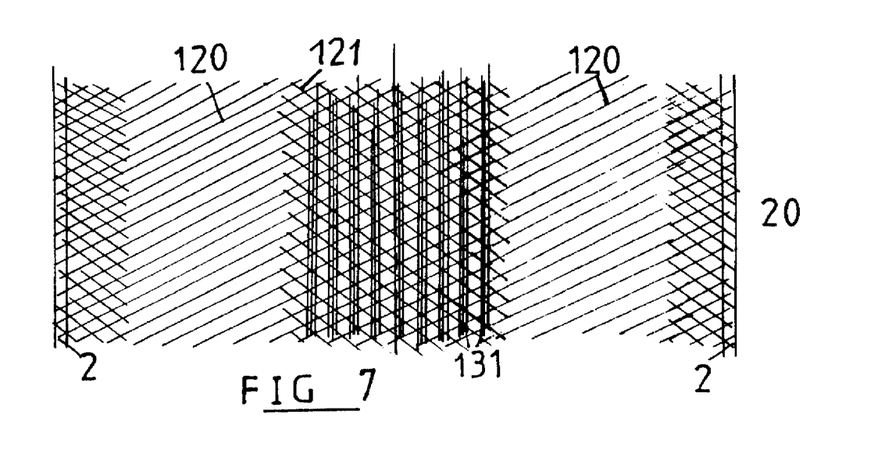

The architecture shown in FIG. 7 comprises a sidewall and crown reinforcement ply 120, since it is continuous from bead wire 2 to bead wire 2, said ply 120 being formed of the same breaking-core elements as previously, said elements being parallel to each other in the ply and forming an angle of 60° (but possibly being between 50° and 85°) with the circumferential direction, measured at the crown of the membrane. The ply 120 in the crown is surmounted radially by a crown ply 121 of defined axial width composed of the same reinforcement elements as those of the ply 120, but crossed with the latter, forming the same angle, but of opposite direction, with the circumferential direction. The ply 121 may be radially surmounted by the support strip 14 provided with frustoconical elements in relief 140 which are spaced apart by the recesses 141. These frustoconical "blocks" form circumferential rows on the surface of the tread 14, such that, between two axially adjacent rows of blocks 140, there is arranged a hooping strip 131 of circumferential cables, the assembly of which forms the hooping ply 13. The ply 121 may also be surmounted more simply by a hooping ply such as that shown in FIG. 5 and described in the passage corresponding to said figure.

I claim:
1. A reinforced rubber membrane,
   used as a tread support means for a tire, and forming with said tire and its mounting rim a travelling assembly which is capable of travel when the tire is subject to a loss of pressure, the rim having a flange and a rim seat, the rim having a nominal diameter $D_S$ and the flange having an external diameter $D_R$,
   inflated during use to a pressure $p_0$ greater than the pressure $p_1$ of the cavity of the tire, and having, in the inflated state, a crown radius $R_M$ less than the loaded radius $R_E$ of the tire used at its recommended pressure, said membrane being reinforced in its crown by at least two plies of cords or cables parallel to each other in each ply and crossed from one ply to the next, at least one of said plies being a so-called hooping ply composed of at least one layer of cords or cables, oriented circumferentially and having a breaking load per cm of ply making it possible firstly to resist the tension due to the maximum centrifugal force to which the tire is subjected, increased by the tension due to the pressure differential $p_0-p_1$ existing during normal travel, and secondly the breaking of the cords or cables for a pressure differential $p_0-p'_1$ greater than $p_0-p_1$, and reinforced in each of its sidewalls by at least one ply, the membrane being characterized in that, viewed in meridian section, the sidewall reinforcement ply is anchored in each lower part of the sidewall by winding around an inextensible annular reinforcement element, which does not break under the action of the tension induced by the action of the sidewall ply and the internal diameter D of which is between the value $D_R$ and a value equal to $D_S$ minus the product of the width $L_S$ of the rim seat and the tangent of the angle of inclination of said seat, said sidewall reinforcement ply being formed of reinforcement elements, each element comprising a core surrounded by a helically wound cord or cable, the said core having a breaking load which is firstly greater than the tension, per element of ply, due to the pressure differential $p_0-p_1$ and to the maximum centrifugal force to which said element is subjected, and secondly such that it permits the breaking of said elements of the sidewall ply for a pressure differential $p_0-p'_1$ greater than $p_0-p_1$ and after the breaking of the elements of the hooping ply, and said reinforcement element of the sidewall ply having a curve, representing the tension as a function of the relative elongation $\epsilon$, having, for an elongation greater than the elongation at break $\epsilon_A$ of the core, a segment in which the variation in the tractive force as a function of the elongation is substantially zero, the elongation at break $\epsilon_R$ of the reinforcement element being at least equal to the ratio of the difference between the internal meridian length of the tire and the external meridian length of the membrane to the external meridian length of the membrane.

2. A membrane according to claim 1, characterized in that the internal diameter D of the inextensible annular reinforcement element lies between the value $D_S$ and the value equal to $D_S$ minus the product of the width $L_S$ of the rim seat and the tangent of the angle of inclination of said seat.

3. A membrane according to claim 2, characterized in that the reinforcement elements of the crown and/or hooping reinforcement ply (plies) are also formed of breaking-core reinforcement elements.

4. A membrane according to claim 1, characterized in that it is reinforced overall by two plies, each ply being formed of breaking-core reinforcement elements which are parallel to each other in the ply, and crossed from one ply to the next, each ply having a width such that one of its ends is located in the region of one of the shoulders of the membrane, whereas the other end of said ply is the end of an upturn which it forms after winding around an annular reinforcement element in the lower part of the membrane sidewall located on the opposite side to said shoulder, the two plies, in the region of the crown of the membrane, performing the function of crown reinforcement plies of elements which are parallel to each other in each portion of ply and crossed from one ply to the next, forming an angle of between 50° and 85°, measured in the equatorial plane, with the circumferential direction, and in the region of the sidewalls performing the function of a sidewall reinforcement ply, each sidewall being reinforced by a ply of elements forming with the equatorial direction an angle of at most 90° but greater than the angle measured in the equatorial plane, and the reinforcement of the crown being completed by hooping bands of reinforcement elements oriented circumferentially.

5. A membrane according to claim 1, in which the inextensible, annular reinforcement elements are bead wires, characterized in that it is reinforced overall by a ply of radial breaking-core elements which are axially continuous from bead wire to bead wire, surmounted radially at the crown of said membrane by a hooping ply, formed of reinforcement elements such that the breaking load per cm of ply is a linear function of the inflation pressure $p_1$ of the cavity of the tire, the angular coefficient of the representative straight line being equal to 0.05 and the ordinate at the origin of said straight line being equal to $0.3 \times 10^5$ Pa.

6. A membrane according to claim 1, in which the inextensible annular reinforcement elements are bead wires, characterized in that it is reinforced overall by two plies which are continuous from bead wire to bead wire, formed of breaking-core reinforcement elements crossed from one ply to the next, forming with the circumferential direction an angle, measured in the equatorial plane of the membrane, of between 50° and 85°, said two plies being sidewall reinforcement plies and crown reinforcement plies, the crown being complementarily reinforced by a hooping ply formed of reinforcement elements such that the breaking load per cm of ply is a linear function of the inflation pressure $p_1$ of the cavity of the tire, the angular coefficient of the representative straight line being equal to 0.05 and the ordinate at the origin of said straight line being equal to $0.3 \times 10^5$ Pa.

7. A membrane according to claim 1, in which the inextensible annular reinforcement elements are bead wires, characterized in that it is reinforced overall by a reinforcement ply, which is continuous from bead wire to bead wire, said ply being formed of breaking-core reinforcement elements, said elements being parallel to each other in the ply and forming an angle of between 50° and 85° with the circumferential direction, measured in the equatorial plane of the membrane, said ply, in the crown, being surmounted radially by a crown ply of defined axial width composed of the same reinforcement elements as those of the ply continuous reinforcement, but crossed with the latter, forming the same angle in absolute value with the circumferential direction, said crown ply itself being radially surmounted by a support band provided with frustoconical elements in relief which are spaced apart by circumferential rows in which there are arranged hooping strips of circumferential cables, the assembly of which forms the hooping ply.

8. A membrane according to claim 7, characterized in that the crown ply is itself radially surmounted by a support band provided with the frustoconical elements in relief which are spaced apart by circumferential rows in which there are arranged the hooping strips of circumferential cables, the assembly of which forms the hooping ply.

9. A membrane according to claim 7, characterized in that the crown ply is surmounted by a hooping ply arranged radially beneath the support band, said hooping ply being formed of reinforcement elements such that the breaking load per cm of ply is a linear function of the inflation pressure $p_1$ of the cavity of the tire, the angular coefficient of the representative straight line being equal to 0.05 and the ordinate at the origin of said straight line being equal to $0.3 \times 10^5$ Pa.

10. A membrane according to one of claims 4 to 9, characterized in that at least one ply of reinforcement elements which undulate in the plane of the ply completes the crown reinforcement of said membrane.

* * * * *

UNITED STATES PATENT AND TRADEMARK OFFICE
CERTIFICATE OF CORRECTION

PATENT NO. : 6,481,481 B2 Page 1 of 1
DATED : November 19, 2002
INVENTOR(S) : Clouet, Alain It is certified that error appears in the above-identified patent and that said Letters Patent is hereby corrected as shown below:

Title page,
Item [56], References Cited, OTHER PUBLICATIONS, "Et. Al." should read
-- et al. --

Column 1,
Line 67, "in," should read -- in --

Column 2,
Line 11, "in-permanent" should read -- in permanent --
Line 61, "fire" should read -- tire --

Column 3,
Line 2, "fire" should read -- tire --
Lines 31 and 35, "$p_0-P_1$" should read -- $p_0-p_1$ --

Column 4,
Line 30, "said," should read -- said --

Column 5,
Line 11, "of-the" should read -- of the --
Lines 16 and 23, "$\delta_A$" should read -- $\varepsilon_A$ --
Line 22, "$\delta_R$" should read -- $\varepsilon_R$ --

Signed and Sealed this

Ninth Day of September, 2003

JAMES E. ROGAN
*Director of the United States Patent and Trademark Office*